Figure 1:
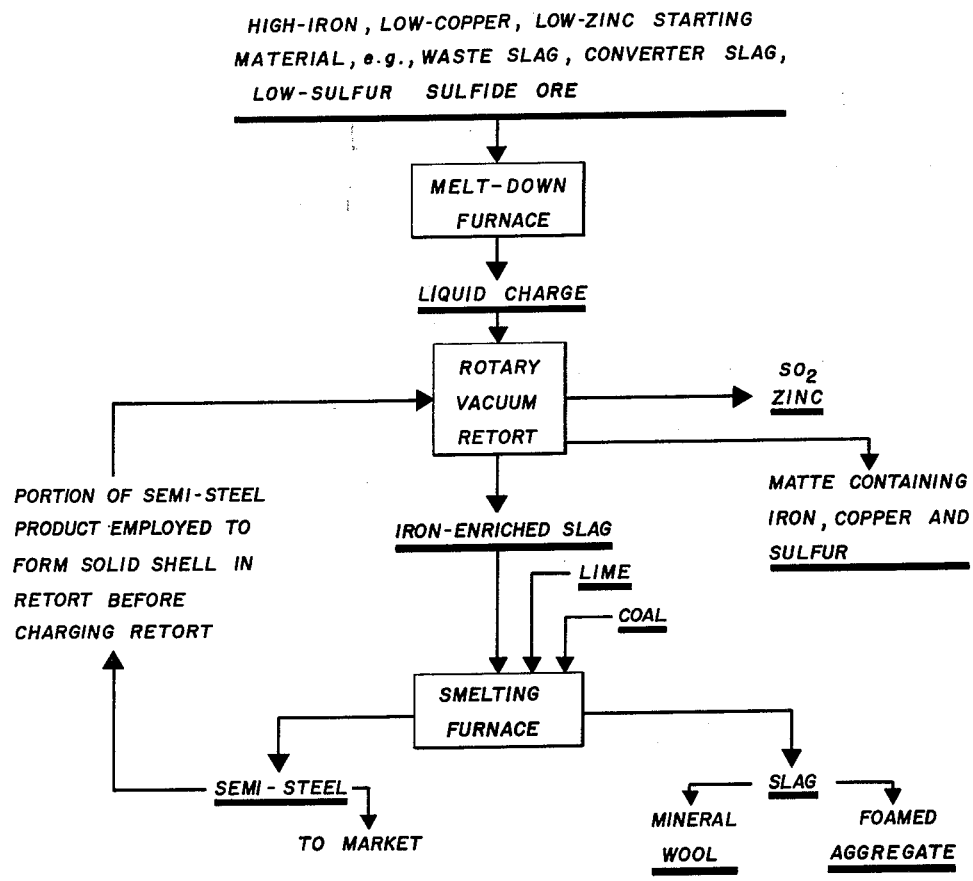

July 30, 1963

O. C. AAMOT 3,099,553

METALLIC SHELL ROTARY REDUCTION OF
IRON-COPPER-ZINC VALUES FROM
SULFIDE ORES AND SLAGS

Filed Oct. 20, 1959

INVENTOR.
OLAV C. AAMOT
BY
Charles J. Elderkin
ATTORNEY 3,099,553
METALLIC SHELL ROTARY REDUCTION OF IRON-COPPER-ZINC VALUES FROM SULFIDE ORES AND SLAGS
Olav C. Aamot, Lewiston, N.Y., assignor, by mesne assignments, to Independence Foundation, Philadelphia, Pa., a corporation of Delaware, and Koppers Company, Inc., Pittsburgh, Pa., a corporation of Delaware
Filed Oct. 20, 1959, Ser. No. 847,547
12 Claims. (Cl. 75—63)

This invention relates to metallurgical processes and particularly to processes involving reduction of minor non-ferrous constituents in iron-rich starting materials. While not limited thereto, the invention finds special application to recovery of iron, preferably in the form of semi-steel, from ores and slags while also recovering valuable non-ferrous constituents of the starting material.

Though many methods for recovering metals from ores, slags and like starting materials have proved commercially successful with starting materials relatively rich in the metal or metals to be recovered, there has heretofore been a definite need for a method capable of economical recovery of both the iron and the valuable non-ferrous constituents from starting materials wherein the proportions of the non-ferrous constituents, while significant, are relatively small. Thus, for example, it has not been economically practical to recover iron, copper and zinc from waste slags which, while containing a major proportion of iron, have proportions of copper as low as a fraction of a percent and proportions of zinc which are at most a few percent. Yet, great quantities of such slags, representing a large potential source of valuable metals, are available for treatment. Thus, the accumulated Clarkdale, Arizona, copper reverberatory slag alone amounts to 26 million tons, containing approximately 8 million tons of iron, 250 million pounds of copper and 1,100 million pounds of zinc. Many sulfide and other ores and slags containing major proportions of iron and only minor, but significant, proportions of non-ferrous metals, offer a still greater potential source of valuable metals but are not capable of being worked economically by known methods.

In view of the nature of such starting materials, it is logical to approach the problem of recovering the metallic values therefrom by first reducing the non-ferrous constituents, producing a matte bearing the non-ferrous constituents and a slag of high iron, low non-ferrous analysis, and then smelting the slag to produce semi-steel. Using conventional procedures, however, severe difficulties are encountered when such a treatment is attempted. First reduction of the relatively small amounts of non-ferrous metals present in such starting materials is both difficult and slow when the less expensive conventional reductants are employed. Next, neither the matte nor the slag obtained are well suited for subsequent recovery of their valuable components. While such metals as copper are considerably concentrated in the matte, a relatively large proportion of the iron also is found therein. On the other hand, the slag so produced always tends to contain amounts of non-ferrous constituents, especially copper, which are undesirably high if the slag is to be smelted into semi-steel. Insofar as production of semi-steel is concerned, the problem is complicated by the fact that the starting material frequently contains a significant proportion of sulfur and, barring special treatment and added expense, the slag obtained for smelting contains a proportion of sulfur which is excessive for making semi-steel.

The present invention provides a novel and improved method for recovering both iron and non-ferrous metals from starting materials of the type hereinbefore referred to, such method including the rapid, effective and relatively inexpensive reduction of the reducible constituents of the starting material. Considered broadly, this method employs hot solid iron as the reductant, molten charge of the starting material being maintained in surface contact with the iron while exposed to an atmosphere of reduced pressure, certain non-ferrous components being vaporized from the molten charge for separate recovery, while others are taken up by the iron, the material of the charge ultimately being recovered as a slag poor in non-ferrous materials and especially well suited for smelting into semi-steel (i.e., metal having less carbon than cast iron), and the iron, employed as the reductant, being converted into a matte containing valuable recoverable, non-ferrous constituents.

The method offers particular advantages in the treatment of starting materials containing significant proportions of both zinc and copper in reducible form. In this regard, the invention is based in part upon the fact that, since zinc and copper have a great mutual affinity, a copper-poor slag suitable for smelting into semi-steel cannot be produced without accomplishing a very effective removal of the zinc. When starting materials containing both zinc and copper are treated in accordance with the invention, it being understood that the hot solid iron is effective to accomplish reduction of both materials, at least a predominant proportion, and advantageously substantially all, of the zinc is vaporized for recovery as zinc metal or as the oxide, while at least a major proportion of the copper is transferred to the hot solid iron.

The method is carried out with greatest facility when the hot solid iron is employed in the form of a hollow body, such as a cylinder, cup or the like, the molten charge being introduced to the space within such body, and the body being moved, as by rotation, to accomplish effective and uniform contact between the molten charge and the hot iron surface.

The temperature of the molten charge is maintained above the melting point of the ore or slag which forms the starting material, but below that temperature at which the iron body liquifies. In this connection, a substantial differential between the temperature of the molten charge and the solid reducing metal is desirable since, as non-ferrous materials transfer to the reducing metal, the melting point thereof gradually decreases, so that at least the surface of the solid reducing metal becomes progressively softer as the treatment progresses. The molten material of the charge is separated from the reductant metal at a time when the latter is still solid, even though substantial softening may have occurred.

A typical flow sheet for the method in its preferred form is shown in FIG. 1. The starting material is reduced to molten condition in any suitable melt-down apparatus, such as a conventional oil-fired reverberatory furnace, short-shaft furnace, etc. In the case of operations conducted with a native bulk ore, as distinguished from converter slags or waste copper smelter slags, it may prove beneficial to pre-treat the material in a kiln. Alternatively, in regions having abundant inexpensive electrical power, the melt-down of bulk ores can be effected advantageously within an electric furnace, such as that described in U.S. Patent No. 2,800,396, issued to Marvin J. Udy on July 23, 1957. Contact between the molten charge and the reducing metal is preferably accomplished in a rotary vacuum retort, as, for example, in a so-called "Aamot Retort" (infra), the iron being cast as a shell in the retort before introduction of the molten charge. The interior of the retort is maintained at a pressure suitably below atmospheric pressure, and the retort is rotated while heating the interior thereof to keep the charge molten but below the temperature at which the cast shell liquifies.

As rotation continues, the non-ferrous components of the charge are reduced, zinc is vaporized from the charge, and copper and sulfur are absorbed by the hot metal of the cast shell. A large part of the sulfur is simultaneously expelled as $SO_2$, by reason of reactions which are explained in greater detail hereinafter. After a suitable time period, advantageously such as to assure substantially complete removal of the zinc, the molten charge material is removed from the retort in the form of a purified slag. The purified slag is delivered to a smelting furnace, such as the electric furnace shown in the aforementioned U.S. Patent 2,800,396, for example, with the addition of lime as flux and coal as a reducing agent, and is smelted to semi-steel.

An amount of reducing metal is employed which is equal to at least several times the quantity necessary for complete reduction of the non-ferrous constituents of the molten charge. The body of solid reducing metal is employed to treat several molten charges in sequence. After removal of the last molten charge treated, the material of the reductant body is melted and recovered as a matte containing non-ferrous values.

In a particularly advantageous embodiment, the method is carried out with a rotary vacuum retort of the type disclosed in my copending application Serial No. 440,886, filed July 2, 1954, now U.S. Patent 2,931,708, issued April 5, 1960. Illustrated diagrammatically in FIG. 2 of the drawings, such a retort comprises a generally cylindrical chamber 1 lined with refractory or the like at 2 and supported, as by rollers 3, for rotation about its longitudinal axis. The interior of the chamber is heated by an axially extending central heating element 4, advantageously an electrical resistance heating element of the type fully described in the aforementioned copending application. The reducing metal is introduced in molten form to the chamber and, while the chamber is rotated, is allowed to solidify, forming the cylindrical shell 5. The molten charge indicated at 6 is then introduced, while the shell 5 is still near its melting point. Continued rotation of chamber 1 then effects intimate surface contact between the molten material of the charge and the hot solid metal making up the shell 5, it being understood that such rotation causes agitation of the molten charge in such fashion that all of the molten material of the charge is contacted with the solid metal of the shell. The interior of the chamber, and thus the space in which the molten charge is disposed, is maintained at a suitably reduced pressure in any suitable fashion, as by conventional steam jet evacuators. The pressure is advantageously maintained at about 1 mm. (1/760 of an atmosphere) or less to effect rapid vaporization of zinc and like components of the charge.

Zinc vaporized from the molten charge is removed from chamber 1, condensed and recovered as metallic zinc, removal and condensation being accomplished, for example, in the fashion described in the aforementioned copending application, Serial No. 440,886, now U.S. Patent 2,931,708, issued April 5, 1060.

In the embodiment of the invention illustrated in the flow sheet of FIG. 1, it is advantageous to employ semi-steel, taken from product in a preceding run, as the material for the solid reductant body. Other metallic materials in which iron is the predominant metal can be similarly employed. Thus, the reductant body can be of any steel, cast iron, or the like, which will not melt at the operating temperatures employed.

Employing a rotary vacum retort of the type referred to, it is convenient and advantageous to cast the reductant metal body in the form of a hollow cylindrical shell and to rotate the same in order to assure good surface contact between the reductant metal and the molten charge. The reductant metal can be cast in other hollow shapes, however, as in the form of a cup, for example, so long as the shape is such as to provide a large interior surface for contact with the molten charge. The cast shape must, of course, also be of such nature that the charge can be introduced to the interior thereof and discharged therefrom. While it is advantageous to employ continuous rotary movement of the cylindrical reductant shell 5, FIG. 2, various types of intermittent and compound motions can also be used, so long as the relative motion between the solid reducing metal and the molten charge is such as to assure intimate contact of all of the charge material with the reducing metal. In addition, the continuous or intermittent motion of the liner-reductant carries the reducing surface out of contact with the slag phase on a cyclic basis thereby permitting the zinc to be "flashed-off" or evaporated above the slag.

Employing a rotary vacuum retort, so that the reducing metal is cast in the form of a hollow cylindrical shell and is rotated about its longitudinal axis, the speed of rotation is kept relatively low, as on the order of 5–10 revolutions per minute, to assure good exposure of reduced zinc or like non-ferrous metal to flash evaporation.

Assuming that the starting material contains zinc in the form of the oxide, the iron of the semi-steel or other reducing metal acts to reduce the zinc to elemental form:

(1) 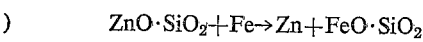
$$ZnO \cdot SiO_2 + Fe \rightarrow Zn + FeO \cdot SiO_2$$

The elemental zinc produced is vaporized and the $FeO \cdot SiO_2$ enters the molten material of the charge. Copper present in the charge in oxide form is similarly reduced by the iron of the reducing metal:

(2) 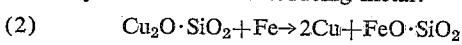
$$Cu_2O \cdot SiO_2 + Fe \rightarrow 2Cu + FeO \cdot SiO_2$$

Here, however, the elemental copper resulting from the reduction is absorbed on the surface of the body of reducing metal, and the $FeO \cdot SiO_2$ goes into the molten charge. Sulfur and any phosphorous present in the starting material are also reduced by the iron of the reducing metal body, yielding the corresponding sulfides and phosphides which are also taken up on the surface of the reducing metal body. Non-ferrous metals present as sulfides in the starting material are also reduced, as follows in the case of zinc:

(3) 
$$ZnS + Fe \rightarrow Zn + FeS$$

Here, the elemental zinc is vaporized and the iron sulfide deposited in the reducing metal. In addition, under the vacuum conditions employed, both $ZnO$ and $Cu_2O$ as well as $Fe_3O_4$ which is usually present, act as oxidizers with respect to $FeS$, in the same manner that the oxygen of air burns off both $Fe$ and $S$, to produce $FeO$ and $SO_2$.

Because of its strong affinity for copper, the zinc produced in reaction (1) tends, as it passes through the molten charge material, to carry some of the copper with it, the zinc and copper separating as the volatilizing zinc escapes from the molten charge. Hence, it is highly advantageous to remove as much of the zinc as possible early during the treatment in the retort, since presence of the zinc will tend to make transfer of the copper to the body of reducing metal more difficult. Employing a rotary retort under vacuum in the manner described it is possible to remove substantially all of the zinc from the charge without employing unduly long time periods.

From the foregoing reactions, it will be noted that sulfur, as well as phosphorous when the latter is present in the charge, tend to be concentrated on the hot surface of the reducing metal body. Since these elements have a strong affinity both for copper and iron, their presence at the interface aids the transfer of copper from the molten material of the charge to the body of reducing metal.

It is worthy to note that there exists a great similarity between the strong oxidizing conditions encountered in a conventional copper converter and the equally pronounced oxidizing conditions exhibited with respect to a matte under vacuum conditions within the process of the invention. For example, it is well known that in the operation of a conventional copper converter, the oxygen in the air preferentially burns FeS to FeO and $SO_2$, respectively, as well as Fe to FeO, and lastly, $Cu_2S$ to $SO_2$, leaving so-called "blister copper" of 98–99% Cu as the residual element surviving the oxidizing influence. The $SO_2$ evolved exits with nitrogen and unburned oxygen, and the FeO produced (along with quantities of $Fe_3O_4$) become dissolved with added silica forming the converter slag.

In the present process, under vacuum conditions, assuming a normal copper reverberatory slag containing some Cu and ZnO residuals, and a major content of an FeO-silicate slag, the following oxidants are present:

(1) $Cu_2O \cdot SiO_2 = 2Cu + O + SiO_2$
(2) $Fe_3O_4 = 3FeO + O$
(3) $FeO = Fe + O$
(4) $ZnO = Zn + O$ The sulfides to be oxidized are principally FeS and ZnS, which are oxidized before any $Cu_2S$ oxidizes. Since both ZnS and FeS exhibit a considerable vapor pressure at 1300° C., small particles of these sulfides will tend to float to the top of the slag phase and form an enriched layer there. At such high concentrations, these sulfides readily enter into reaction with the oxidants carried in the slag and will also become attached to the revolving steel shell, with the result that they are repeatedly drawn through the slag producing $SO_2$ and elemental zinc in accordance with the following equations:

(I)   $FeS + 3ZnO \rightarrow FeO + 3Zn + SO_2$
(II)  $FeS + 2Fe_3O_4 \rightarrow Fe + SO_2 + 6FeO$
(III) $ZnS + Fe_3O_4 \rightarrow Zn + SO_2 + xFeS \cdot FeO \cdot SiO_2$ The foregoing reactions will proceed rapidly at 1300° C., but at least some ZnS and FeS will distill over into the zinc condenser unit and escape oxidation, in that, the $SO_2$ evolved will not attack these sulfides noticeably under the short contact time and decreasing temperatures encountered in the condenser. On the other hand, it has been found that the $SO_2$ in the condenser will not attack the zinc vapors either, so that it becomes entirely possible to condense and recover elemental zinc as well as $SO_2$ from the gas stream (which will also contain carbon monoxide). The FeS and ZnS impurities distilled over into the condenser may be eliminated to a large extent through use of a filter (steel turnings, for example) inserted between the zinc condenser and the exit port of the vacuum retort, along with values of lead or lead sulfide and silver, when present.

In accordance with the reaction mechanism of Equation III above, it is found that even at a temperature of the order of 1100° C., a high-grade flotation concentrate on ZnS can be reacted with magnetite to recover all of the zinc in elemental form in the condenser, leaving a molten residue containing up to 15% of the sulfur, along with the balance of the iron in the form of a low-melting point $FeS \cdot FeO \cdot SiO_2$ slag. At high temperatures, such as 1300° C., more FeS is oxidized by the FeO present, and to some extent one also obtains $SO_2$ from the reaction:

(IV)   $FeS + 2FeO \rightarrow SO_2 + 3Fe$

The steel retort liner will contain exposed carbon in the form of cementite or free carbon, which will be quickly oxidized to CO by ZnO, $Fe_3O_4$, $Cu_2O$ and also by FeO, particularly in view of the vacuum conditions prevailing.

In addition to the foregoing reactions, there is present the action of the steel liner, whereby the iron will react with the oxides or sulfides of zinc producing elemental zinc and iron oxide which enters the slag, whereas the iron sulfide will tend to dissolve into the iron to the extent that it might escape the oxidation to FeO and $SO_2$ in accordance with Equations I and II. On the other hand, the rotational movement of the steel liner brings fresh surfaces above the slag bath in cyclic fashion, whereby the vacuum forces function without restraint to flash off films of zinc deposited or formed by contact of the reactants below the slag bath. At the same time, the movement of the large steel surface of revolution tends to collect films of the sulfides on its surface and to move these into renewed contact with the dissolved oxygen content of the slag bath, thereby promoting more complete reactions than would be possible under normal or static retort conditions.

Inasmuch as copper is the most "noble" element within the reacting mixture of compounds and elements, and at the same time the least susceptible to vaporization, it will be the last element to survive after one exposes the steel to successive charges of slag, drawing from each a corresponding amount of elemental zinc along with the unavoidable amounts of distillable sulfides of zinc and iron.

When a point is reached at which the accumulation of sulfur in the residual iron has risen to the order of 15–20% by weight, the steel liner will become molten and will settle as a heavy layer beneath the slag, with the result that the reactions or rate of reactions are slowed owing to the fact that the matte will then be shielded against the forces of vacuum by the heavy supernatant slag layer. At this point, which also corresponds to an accumulation of copper within the matte of the order of 15–20% by weight, one may discharge the slag and matte from the retort, taking the matte into a conventional copper converter for blowing with air or oxygen to produce blister copper and a converter slag, rich in iron, which may be recycled to a fresh slag charge within a newly-lined steel retort.

Alternatively, by increasing the speed of rotation of the retort, one can form a film of the liquid and heavy matte suspended on the revolving lining of the retort, and thereby expose it to the full forces of vacuum to continue the flash-off of zinc and bring the matte to an eventual analysis of blister copper.

Since metallic copper is also capable of taking oxygen away from zinc oxide under vacuum conditions, and also of taking sulfur away from the sulfides of zinc and iron, and further in view of the fact that the resulting copper oxide and sulfide will again expel sulfur dioxide in accordance with conventional copper converter reactions, it will be readily appreciated that the copper diffusing into the steel liner will not diminish the reducing rate of the steel to any great extent. Furthermore, since the reactions are conducted well above the melting point of copper, it is found that the copper is rapidly taken into solution in the iron, diffusing inwardly, and maintaining fresh surfaces of iron exposed inwardly towards the reaction mixture.

In general, in the application of the process of the invention to the recovery of the copper and zinc values present within a waste reverberatory slag, the oxidizing reactions, i.e., producing $SO_2$ and metal oxides, will proceed substantially simultaneously with the reactions promoted by the steel liner, i.e., the reduction of the metal oxides of zinc and copper to elemental form by the iron and carbon of the liner. Eventually, all of the iron in the lining may be replaced by copper sulfide, and this may be oxidized, in turn, to relatively pure elemental copper, completely free of vaporizable oxides of zinc, arsenic, antimony, bismuth and lead.

As will be readily apparent to a skilled technician, one may add auxiliary oxidants to the system, such as magnetite, for example, which then functions to enrich the slag in iron. Alternatively, zinc oxide may be added, or any similar oxidant, to the extent that the sulfur present will accommodate such additions. To effect savings with respect to the expendable steel liner, one may also add scrap iron, or to augment the copper recoveries, scrap brass and the like can be charged to the retort for the recovery of elemental zinc and copper in combination with the normal copper produced.

The method has the advantage that, being vaporized out of the starting material, the zinc is recoverable as such and is also eliminated as a deterrent to removal of copper.

While this advantage makes the invention particularly useful in producing semi-steel from starting materials containing both zinc and copper, it will be understood that other non-ferrous metals can be handled in the same fashion as zinc. Thus, when the method is applied to ores or slags containing lead or silver, i.e., lead blast furnace slags, for example, the lead or silver is vaporized from the molten charge in the same manner as described with reference to zinc.

The following example illustrates the specific application of one advantageous embodiment of the method to the recovery of zinc, copper and iron, with the latter provided in the form of semi-steel, from a waste copper slag:

*Example*

The starting material is Clarkdale waste copper smelter slag having the following analysis:

|  | Percent |
|---|---|
| Fe | 33.4 |
| Cu | 0.6 |
| Zn | 2.6 |
| $SiO_2$ | 35.4 |
| CaO | 5.5 |
| MgO | 2.6 |
| $Al_2O_3$ | 8.0 |
| S | 1.2 |

Three hundred thousand pounds of the slag is employed in 10 separate 30,000 lb. charges as described below, the charges being reduced to molten state by means of an oil-fired reverberatory furnace.

Figure 2:
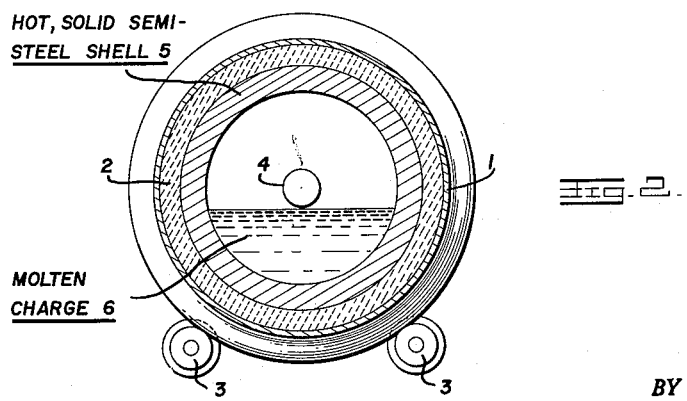

The method is carried out with a rotary vacuum retort as described with reference to FIG. 2, the retort being constructed generally in accordance with the aforementioned copending application Serial Number 440,886, with the retort chamber having a diameter of 11 ft. and an internal volume of 500 cu. ft. Before any of the starting material is charged to the retort, approximately 12,000 lb. of molten semi-steel containing 1.5% carbon and having a melting point of about 1,400° C., is introduced into the retort and, while rotating the retort chamber, the steel is allowed to solidify into a cylindrical shell, as indicated at 5, FIG. 2 approximately 1¼ in. in thickness.

With the semi-steel of the shell still at a temperature near its melting point, the first 30,000 lb. molten charge of the starting material is introduced to the interior of the shell with the temperature of the molten charge being initially at approximately 1,300° C. The retort chamber is then rotated at 5 r.p.m. for 2 hours while maintaining the interior thereof at a pressure of approximately 1,000 microns of mercury, the temperature of the molten charge being kept at or slightly above 1,300° C., by means of heating element 4, FIG. 2, throughout the two-hour period. During this period, vaporized zinc is removed from the retort chamber, condensed and recovered as elemental zinc, removal and condensation being in accordance with the aforementioned copending application Serial Number 440,886. The molten charge material is then discharged from the retort as a purified slag, the amount of purified slag obtained being approximately 30,000 lb.

Nine additional 30,000 lb. charges of the starting material are treated, in sequence, in precisely the same fashion just described, each yielding approximately 30,000 lb. of purified slag. The total zinc recovered in metallic form during treatment of the 10 charges of starting material amounted to approximately 7,700 lb.

After treatment and removal of the tenth charge, the residual material of the shell 5 is melted and discharged from the retort as a matte containing approximately 1,600 lb. of copper.

The total of the purified slag, now analyzing 37% iron, less than 0.1% zinc and approximately 0.05% copper, relatively clean of sulfur and phosphorous, is smelted to semi-steel in an electric furnace of the type described in the aforementioned U.S. Patent No. 2,800,396, using 300 lb. of lime as flux and 100 lb. of coal as reducing agent per 1000 lbs. of slag.

The total yield of semi-steel is 112,000 lb., of analysis as follows:

|  | Percent |
|---|---|
| C | 2.75 |
| S | 0.05–0.01 |
| P | 0.02 |
| Cu | 0.15–0.25 |
| Si | 0.10 |
| Fe | Approx. 97 |

Twelve thousand pounds of the semi-steel so produced is returned to the retort in molten condition and cast therein as a cylindrical shell preparatory to the treatment of 10 additional 30,000 lb. charges of the starting material. The smelting operation also yields 240,000 lbs. of slag of excellent quality. Of this, 10,000 lb. is blown by conventional procedure into light-colored mineral wool and the remaining 230,000 lb. is converted by a conventional procedure to foamed aggregate.

The copper-bearing matte material recovered from the retort by melting of the lining 5 after treatment of the tenth charge of starting material can be handled in any conventional fashion for recovery of the copper and other metallic values therefrom.

What is claimed is:

1. In a method for upgrading a material selected from the group consisting of ores and slags containing a major proportion of iron and minor proportions of zinc and copper, the improvements in combination therewith comprising,
    (a) reducing and vaporizing said zinc by maintaining a molten body of said material under sub-atmospheric pressure in contact with the interior of a hot, hollow, solid metallic body which contains iron as a predominant metallic constituent and which melts at a temperature above the temperature of said molten body;
    (b) recovering the zinc so vaporized;
    (c) reducing said copper by contacting with said hot solid body as in step (a);
    (d) causing said copper to be absorbed into said hot solid body;
    (e) separating the remaining material of said molten body as a useful product containing a proportion of iron greater than in the starting material; and
    (f) recovering the material of said solid body as a copper-bearing product.

2. The process as claimed in claim 1, wherein step (f) is not taken until after several cycles of steps (a) through (e).

3. The process as claimed in claim 1, wherein relative movement is effected between said molten and solid bodies during steps (a), (c) and (d).

4. The method of obtaining useful products from a metal-bearing starting material containing a major proportion of iron and minor proportions of zinc and copper, comprising,
    (a) providing a hot, hollow metallic body of a solid material containing predominantly iron which has a higher melting point than said starting material;
    (b) introducing into said hollow body a molten charge of said starting material, said hollow body containing an amount of iron greater than the stoichiometric quantity required for complete reduction of the zinc and copper in said charge;
    (c) reducing and vaporizing said zinc and reducing said copper by maintaining said charge in molten condition at a temperature below the melting point of the hollow body while rotating the hollow body and maintaining the interior thereof at a pressure less than atmospheric pressure;
    (d) continuing step (c) until most of said zinc has been removed from said molten charge and most of said copper had been absorbed in said hollow body; and (e) discharging the remaining molten material of said charge from said hollow body and recovering said remaining molten material as an iron-enriched slag poor in copper and zinc.

5. The process as claimed in claim 4, wherein steps (a) through (e) are repeated with additional charges of molten starting material, after which the material of said hollow body is recovered as a copper-bearing matte.

6. The method for producing a semi-steel product low in sulfur from a starting material selected from the group consisting of slags and ores containing a major proportion of iron, minor proportions of copper and zinc and a significant proportion of sulfur comprising (a) reducing said copper and zinc by charging a molten charge of said starting material into the interior of a hot, hollow, rotating solid metallic body containing at least about 95% iron as a reducing agent;

(b) vaporizing said reduced zinc by carrying out said reduction in a zone in which the pressure is less than atmospheric pressure;

(c) absorbing said reduced copper with at least some of said sulfur into said solid iron of said rotating body;

(d) separating the remaining molten charge material from the solid iron and recovering said remaining material as a slag containing a greater proportion of iron and smaller proportions of copper, zinc and sulfur than did the starting material;

(e) smelting said slag to produce a low-sulfur semi-steel.

7. The method as claimed in claim 6, and further comprising separating, condensing and recovering said zinc in metallic form.

8. The method as claimed in claim 6 wherein semi-steel produced in step (e) is employed as the hot solid metal required in step (a).

9. The method as claimed in claim 6 wherein the quantity of hot solid metal employed in step (a) contains iron in an amount greater than the stoichiometric quantity required for complete reduction of the copper and zinc values in said molten charge.

10. The method of claim 6 including the further step of recovering slag from said smelting step and disrupting the same to form a light-colored mineral wool.

11. The method of claim 6 including the further step of recovering slag from said smelting step and forming the same into a foamed aggregate.

12. The method as claimed in claim 9, and further comprising repeating steps (a) through (d) with successive molten charges, and thereafter recovering said hot solid metal as a copper-bearing matte.

References Cited in the file of this patent

UNITED STATES PATENTS

| | | |
|---|---|---|
| 1,669,406 | Anderson | May 15, 1928 |
| 2,011,400 | Eulenstein | Aug. 13, 1935 |
| 2,399,606 | Schuh et al. | Apr. 30, 1946 |
| 2,468,654 | Brundell et al. | Apr. 26, 1949 |
| 2,566,548 | Beauchesne et al. | Sept. 4, 1951 |
| 2,829,044 | Clasen | Apr. 1, 1958 |

FOREIGN PATENTS

| | | |
|---|---|---|
| 504,227 | Germany | Aug. 1, 1930 |
| 575,336 | Great Britain | Feb. 13, 1946 |